United States Patent [19]

Setzke

[11] Patent Number: 5,395,436
[45] Date of Patent: Mar. 7, 1995

[54] WATERBORNE WIPING STAIN FOR WOOD

[75] Inventor: David Setzke, Milwaukee County, Wis.

[73] Assignee: PPG Industries, Inc., Pittsburgh, Pa.

[21] Appl. No.: 187,989

[22] Filed: Jan. 28, 1994

[51] Int. Cl.⁶ .................. C09D 15/00; C09D 101/00; C09D 101/28
[52] U.S. Cl. ..................... 106/34; 106/170; 106/197.1; 106/197.2; 523/335; 523/342
[58] Field of Search ............ 106/34, 170, 197.1, 106/197.2, 203; 523/334, 35, 42, 43, 44, 45, 46

[56] References Cited

U.S. PATENT DOCUMENTS

| | | | |
|---|---|---|---|
| 4,432,797 | 2/1984 | Vasishth et al. | 106/34 |
| 5,149,729 | 9/1992 | Englund | 524/366 |

*Primary Examiner*—David Brunsman
*Attorney, Agent, or Firm*—Dennis G. Millman

[57] ABSTRACT

A waterborne wiping stain for wood is provided with an excellent combination of sprayability, lubricity, sag resistance, and holdout by employing a combination of thickeners including hectorite clay, cellulosic thickener, and an associative thickener.

13 Claims, No Drawings

WATERBORNE WIPING STAIN FOR WOOD

BACKGROUND OF THE INVENTION

This invention relates to waterborne compositions for staining porous substrates such as wood.

Reduction of the amounts of organic solvents in coating compositions has been a desirable objective for the sake of reducing the amount of volatile organics released into the atmosphere. Therefore, waterborne coating compositions have come into widespread use. Waterborne stains have also been proposed (e.g., U.S. Pat. Nos. 4,432,797; 4,976,782 and 5,149,729), but providing acceptable performance with a waterborne stain has generally been hampered by the tendency of water to raise the grain of the wood to which a waterborne stain is applied. Significant improvements in waterborne wood stains are disclosed in co-pending, commonly assigned U.S. patent application Ser. No. 07/951,619, filed on Sep. 28, 1992, by R. E. Dean and E. E. McEntire, wherein a vinyl latex resin is disclosed as providing desirable barrier properties in a stain composition.

Stains that are to be used in finer quality woodwork, such as high quality furniture, have additional requirements. More specifically, stains that are hand-rubbed require a certain amount of lubricity and a substantial "open time," that is, a delayed period of time before drying during which they remain workable by rubbing and wiping. It is known that the drying rate can be retarded by adding an oil to the composition, but the oil can have a negative effect on adhesion of subsequently applied coatings. It is also known, as disclosed in U.S. Pat. No. 5,149,729, to employ thickeners for various purposes. Combinations of thickeners have also been suggested in the prior art, but thickeners or combinations thereof had not heretofore been found that imparted to waterborne stains the same desirable wiping qualities possessed by oil based stains.

Thickeners available in the prior art include polysaccharides such as cellulosic materials (e.g., methyl cellulose, hydroxyethyl cellulose, carboxymethyl cellulose, and ethyl hydroxyethyl cellulose) and gums (e.g., xanthan gum and rhamsan gum). These cellulosic thickeners are sometimes available in the form of salts, e.g., sodium salts Clays are also commonly used as thickeners, and hectorite clay in particular has been suggested as a thickener in paints. Yet another type of thickener is known as "associative thickeners" which are synthetic polymeric materials that work in combination with surfactants or other polymers to increase viscosity. One type of associative thickeners are the alkali swellable acrylates such as those sold under the "Acrysol" name by Rohm & Haas. Another type of associative thickener are modified polyurethanes (hydrophobe-modified ethoxylated urethanes) as disclosed in "Interactions of HEUR Associative Thickeners with Waterborne Polyurethanes" by J. P. Kaczmarski et al. in Journal of Coatings Technology, Vol. 65, No. 818, March 1993. These HEUR thickeners associate with the hydrophobic portion of a polymer. A combination of associative thickener and cellulosic thickener in paints is discussed in the above-referenced Kaczmarksi et al. article. U.S. Pat. No. 5,149,729 discloses the combination of an associative thickener and a gum in a waterborne stain composition. A combination of hectorite clay and cellulosic thickeners in paint is disclosed by P. Jenness in "Rheological Design Using Laponite and Cellulose Ethers" in Pitture e Vernici Europe, 6:91.

It should be noted that the considerations for thickener selection for paints and for stains are not the same. Leveling and flow are usually primary considerations with paints, but are of little concern with stains. Stains, on the other hand, require lubricity and working time, factors which are unlikely to be considered when formulating paints.

SUMMARY OF THE INVENTION

The present invention is a waterborne stain composition that includes a combination of three thickening agents that surprisingly yields desirable properties that were not attained by thickeners or combinations of thickeners used in the prior art. The thickening agent combination of the present invention includes hectorite clay, a cellulose thickener, and an associative thickener. This combination has been found to be surprisingly effective in waterborne stains for wood in that waterborne stains incorporating the combination are sprayable, set quickly against sagging after being applied, provide hold-out of water from the wood, and have prolonged open time and lubricity for wiping. Moreover, a synergistic effect appears to be present in that lesser amounts of the thickeners than would be expected are needed in order to achieve these desirable properties.

DETAILED DESCRIPTION

The compositions of the present invention, described as "stains," are generally characterized by low solids contents relative to paint, i.e., less than 50 percent by weight solids. Stains are also characterized as being relatively transparent and adapted to penetrate porous substrates.

One of the components of the thickener combination of the present invention is a smectic clay of the hectorite type. Hectorite is a layered hydrous magnesium silicate, and is characterized as a swelling clay. Hectorite for use in the present invention may be naturally occurring or synthetic. A synthetic hectorite is sold by the Wavefly Mineral Products Co. division of Laporte, Inc., Bala Cynwyd, PA, under the name Laponite ® and is available in several grades. The grade preferred for use herein is Laponite ® RD.

The second thickener component is a water soluble cellulosic thickener. Examples of water soluble cellulosic thickeners include methyl cellulose, hydroxyethyl cellulose, carboxymethyl cellulose, and ethyl hydroxyethyl cellulose and salts thereof. Sodium carboxymethyl cellulose is preferred for compositions of the present invention.

The third thickener component is an associative thickener. Associative thickeners used herein may be either the swellable acrylate type or the modified urethane type. A commercial source is the line of associative thickeners sold under the name Acrylsol ® by Rohm & Haas Co., Philadelphia, Pa.

In order to provide a barrier to hold out subsequently applied coatings, it is desirable for stains to include a resin that at least partially seals the wood surface. The preferred binder resin of the compositions of the present invention comprises a vinyl latex polymer which is the subject matter of commonly assigned U.S. patent application Ser. No. 07/951,619, filed on Sep. 28, 1992, by R. E. Dean and E. E. McEntire. This latex resin may be described as having been formed by free radical initiated copolymerization of vinyl halide monomers and vinylidene monomers in aqueous medium in the presence of a polymeric surfactant. The polymeric surfactant may be characterized as a salt of an acid group containing polymer. A two stage polymerization is used, whereby the polymeric surfactant is polymerized in the first stage, and the copolymerization of vinyl halide and vinylidene halide takes place in the second stage.

Polymeric surfactants suitable for use in synthesizing the preferred vinyl latex resin are disclosed in U.S. Pat. No. 4,647,612 (Ranka et al.). Among the acid-containing polymers which can be employed as the surfactant are virtually any acid-containing polymer which can be neutralized or partially neutralized with an appropriate basic compound to form a salt which can be dissolved or stably dispersed in an aqueous medium. Acid-containing polymers which may be employed include acid-containing acrylic polymers and copolymers, alkyd resins, polyester polymers and polyurethanes. Preferably, the polymeric surfactant is an acid-containing acrylic polymer prepared in the known manner by polymerizing an unsaturated acid, preferably an alpha, beta ethylenically unsaturated carboxylic acid with at least one other polymerizable monomer. Examples of suitable unsaturated acids include acrylic acid, methacrylic acid, crotonic acid, itaconic acid and $C_1$ to $C_8$ alkyl half-esters of maleic acid and fumaric acid including mixtures of acids. Examples of the other monomers to be polymerized with the unsaturated acids to produce the acid-containing acrylic polymers are alkyl acrylates and methacrylates, vinylidene halides, vinyl ethers, and vinyl esters.

Polymerization of the monomers to produce the polymeric surfactant is usually conducted by organic solution polymerization techniques in the presence of a free radical initiator as is well known in the art. The molecular weight of the resulting acid-containing acrylic polymers is usually between about 2000 to 150,000 (preferably 60,000 to 120,000) on a weight average molecular weight basis, and the polymers have acid numbers between 30 and 250. The salt or partial salt of the acid-containing polymer is formed by neutralizing or partially neutralizing the acid groups of the polymer with an appropriate basic compound. Suitable basic compounds which may be utilized for this purpose include inorganic bases such as alkali metal hydroxides, for example, sodium or potassium hydroxide, or ammonia, or organic bases such as water soluble amines, e.g., methylethanolamine or diethanolamine. The degree of neutralization required to form the desired polymer salt may vary considerably depending upon the amount of acid included in the polymer and the degree of solubility or dispersibility of the salt which is desired. Ordinarily in making the polymer water-dispersible the acidity of the polymer is at least 25 percent neutralized with the basic compound.

Unsaturated monomers that are copolymerized in the presence of the polymeric surfactant described above to produce the core of the latex particles include vinyl halide and vinylidene halide, preferably vinyl chloride and vinylidene chloride. The combination of the two monomers is preferred because vinyl chloride alone is relatively brittle and does not yield the adhesion to wood that is desired. Vinylidene chloride alone, on the other hand, tends to produce films that turn yellow and not suitable for clear finishes. In some embodiments of the vinyl latex resin, vinyl chloride and vinylidene chloride constitute the only copolymerizable monomers employed, and the relative amounts of each may range from 9:1 to 1:2, preferably 5:1 to 1:1, most preferably 4:1 to 2:1 on a weight basis. Expressed differently, the monomer feed may include 25 to 90 (preferably 40 to 80) percent by weight vinyl halide and 10 to 50 (preferably 10 to 40) percent by weight vinylidene halide.

In some embodiments of the preferred vinyl latex resin it has been found useful to include additional copolymerizable, unsaturated monomers other than vinyl halide and vinylidene halide to make the core. These additional monomers include alkyl acrylates and methacrylates (e.g., ethyl acrylate, methyl methacrylate, butyl acrylate, butyl methacrylate, lauryl acrylate, and mixtures thereof) and vinyl esters (e.g., vinyl acetate and vinyl versatate) and serve to reduce yellowing of the coating. When such an additional monomer is employed, it may constitute up to about 40 percent, preferably 5 to 30 percent, of the monomer composition from which the core is polymerized.

In preferred embodiments of the vinyl latex resin the copolymerization mixture of vinyl chloride and vinylidene chloride may additionally contain an epoxy group containing alpha-beta unsaturated monomer, which is believed to link the core to the shell and appears to contribute to the clarity of the compositions. Examples of the epoxy group containing monomer include glycidyl acrylate, glycidyl methacrylate, and allyl glycidyl ether. The amount of the epoxy group containing monomer to be included with the copolymerizable monomers may range from 0 to 30 percent by weight, preferably 0.1 to 20 percent by weight of the monomers used to produce the core of the latex.

The vinyl halide and vinylidene halide, preferably vinyl chloride and vinylidene chloride, are copolymerized in aqueous medium with a free radical initiator in the presence of the polymeric surfactant. Relative to the total polymeric content of the latex, the polymeric surfactant may constitute 5 to 50 percent by weight of resin solids, preferably 25 to 50 percent. At the preferred amounts of polymeric surfactant stability of the latex can be maintained at relatively low acid values, thereby providing good water resistance in the cured coating.

The temperature of the latex polymerization is typically from 0° C. to 100° C., usually from 20° C. to 85° C. The pH of the medium is usually maintained from about 5 to about 12. The free radical initiator can be selected from one or more peroxides which are known to act as free radical initiators and which are soluble in aqueous media. Examples include the persulfates such as ammonium, sodium, and potassium persulfate. Also, oil soluble initiators may be employed either alone or in addition to the water soluble initiators. Typical oil soluble initiators include organic peroxides such as benzoyl peroxide, t-butyl hydroperoxide, and t-butyl perbenzoate. Azo compounds such as azobisisobutyronitrile can also be used.

For the vinyl halide and vinylidene halide copolymerization the reactor is typically charged with an appropriate amount of water, polymeric surfactant, and free radical initiator. The reactor is then heated to the free radical initiation temperature and charged with the copolymerizable monomers. Preferably only water, initiator and part of the polymeric surfactant and part of the copolymerizable monomers are initially charged to the reactor. After this initial charge has been allowed to react for a period of time, the remaining monomer component and polymeric surfactant are added incrementally with the rate of addition being varied depending on the polymerization temperature, the particular initiator employed, and the type and amount of monomers being polymerized. After all the monomer components have been charged, a final heating is usually done to complete polymerization. The reactor is then cooled, and the latex recovered. The following examples illustrate specific embodiments of the invention.

The latex particles herein have been referred to as having a "core" and a "shell." It should be noted that while there is evidence indicating that the product of the first stage polymerization becomes located on the exterior of the final latex particle and that the product of the second stage polymerization becomes located in the interior of the latex particle, the "core" and "shell" designations are theoretical and that the actual existence of a discrete core and a shell and the identity of the polymer species in each is not critical to the performance of the present invention. It appears that the order of the polymerization stages is a more significant factor in determining properties of the resin than the theoretical morphology of the latex particles.

The major solvent of the compositions of the present invention is water, but minor amounts of organic solvents may be present within the meaning of "waterborne." Inclusion of small amounts of organic solvents (e.g., acetone) may be beneficial for reducing grain raise. However, the amounts of organic solvents are generally minimized for the sake of minimizing volatile organic content (V.O.C.). Preferred embodiments of the compositions of the present invention have V.O.C. less than 3, most preferably less than 2.6.

The compositions of the present invention contain at least one colorant. Colorants for use in this type of composition are well known to those of skill in the art and include pigments (organic or inorganic) and dyes. Inorganic pigments include metal oxides such as the oxides of iron, titanium, zinc, cobalt, and chrome. Earth colors may employ mineral pigments obtained from clay. Various forms of carbon may be used for black coloration. Organic pigments are typically insoluble and are derived from natural or synthetic materials, and include phthalocyanine, lithos, toluidine, and para red. Organic pigments may be employed in a precipitated form as a lake. Dyes encompass a wide variety of organic materials that may be used in stain compositions, e.g., acid dyes. Dyes that are water soluble particularly lend themselves to use in the stain compositions of the present invention.

Considerable latitude in the concentrations of the constituents of the stain composition may be permitted, taking into account the physical properties of the particular resin and other ingredients that may be employed and the specific needs of a particular application. Typically, the total content of the combination of three thickeners of the present invention may be in the range of 1 to 10, preferably 1 to 5, percent by weight of the total stain composition. Larger amounts may be employed, but it is usually advantageous from a cost standpoint to minimize the amount of thickener used. Therefore, it is an advantage of the present invention that the total thickener content can be relatively low. Although not essential to the general inventive concept, preferred embodiments of the invention have contained the three thickening agents in the following order of concentration: cellulosic thickener < hectorite clay < associative thickener. In the preferred embodiments, cellulosic thickener is present in amounts of 0.02 to 3 weight percent of the total composition, hectorite clay in amounts of 0.1 to 5 weight percent of the total composition, and associative thickener in amounts of 0.5 to 10 percent by weight of the total composition. The resin content may be on the order of 5 to 25 weight percent of the total composition. The colorant concentration may vary widely, but typically would be in the range of 1 to 20 weight percent of the total composition. The largest component of the composition is water, typically ranging from 40 to 90 weight percent of the total composition. Other organic additives may optionally be included in the composition in amounts ranging from 0 to 20, preferably 1 to 15, weight percent of the total composition. These optional ingredients may include lubricating and texturizing materials such as linseed oil and glycerin, and minor amounts of organic solvent. Small amounts of surfactant may also be included.

The following example illustrates an embodiment of the preferred vinyl halide/vinylidene halide copolymerized latex resin that may be used in the stain compositions of the present invention.

RESIN EXAMPLE

Into a 1 gallon stainless steel pressure reactor was charged 1608 grams of a 24.8% solids dispersion of an acrylic polymer {70% ethyl acrylate, 13% styrene, 5% hydroxyethyl methacrylate, 12% acrylic acid, molecular weight (Mw) 80,000, 70% of the acid neutralized with ammonia}, 652 grams of deionized water, 18.38 grams of Pluronic ® F-68 nonionic surfactant available from BASF-Wyandotte, and a solution of 2.76 grams ammonium persulfate and 300 grams deionized water. The reactor was sealed and brought to 22° C. with stirring at 270 rpm and evacuated to about 4 pounds per square inch absolute. The reactor was repressured with nitrogen and the evacuation and repressurization repeated once, then evacuated to 4 pounds per square inch.

Subsequently charged to the vessel was 65 grams of vinyl chloride and 65 grams of vinylidene chloride. The reactor contents were then heated to 65° C. and held at temperature for 20 minutes. Then 367 grams each of vinyl chloride and vinylidene chloride, along with 55.1 grams of glycidyl methacrylate (GMA) were fed into the reaction over 4 hours, and the stir rate was adjusted to 370 rpm for the second hour and to 470 rpm for the third hour. The contents were then held at temperature for 6.5 hours. The product was then vacuum stripped at 40° C. of volatile monomers after adding 100 grams deionized water.

The product had a final solids of 36.6% and viscosity of 246 centipoises (Brookfield Spindle #2 at 25° C.). Dried coagulum was 2.8 grams (after passing the product through a 200 mesh screen).

The following is a comparative example of a stain composition that differs from the preferred embodiments of the present invention only in the thickeners used.

EXAMPLE A

A waterborne stain base was made up by stirring 0.6 grams of "Rhodaplex CO-436" anionic surfactant into 4.0 grams of a water dispersible linseed oil until a uniform mixture was obtained. In a separate container 1.6 grams of "Acrysol RM-825" urethane associative thickener from Rohm & Haas was added to 23.8 grams of deionized water under slow agitation. Under medium agitation the surfactant/linseed oil mixture was added to the water/thickener mixture. The resultant material was allowed to agitate for 15 minutes. Next, 25.9 grams of the waterborne vinyl resin of the Resin Example above was added under agitation. An addition of 44.0 grams of deionized water completed the formulation. A seven percent by weight addition of a waterborne burnt umber tint "Tint-Ayd" CW-5509 burnt umber from Daniel Products Co.) to the above stain base was performed in order to allow for an evaluation of appearance properties.

The completed stain was sprayed onto a one foot square oak veneer panel. A three to four mil thick wet layer of stain was uniformly applied to the panel. The panel was allowed to flash in an air booth where the air movement was measured at 100 ft³/min. Drips and sags were evaluated. After one minute the stain was partially wiped off, leaving wet streaks behind. After one minute, the stain was wiped again, leaving some residual stain on the panel. After one additional minute, the panel was thoroughly wiped. Any streaks were noted. Also, the ease of wiping the stain was noted after each wiping step.

The stain, when applied, had a tendency to run and sag. The stain had good lubricity during the first and second wipe. However, lubricity diminished when the final wipe was performed, during which dry streaks became evident.

The following is an example of a preferred embodiment of the present invention.

EXAMPLE B

A stain having longer open time was made as follows. To 49.2 grams of water, 0.4 grams of "Laponite RD" hectorite clay was added under agitation. This mixture was then dispersed for 15 minutes under high agitation. When completed, 0.1 grams of "Aqualon 7H" sodium carboxymethyl cellulose (CMC) from Aqualon Company, Wilmington, Del. was added. Again this mixture was dispersed under agitation for 15 minutes. In a separate container 1.4 grams of a water dispersible linseed oil and 0.2 grams of "Rhodaplex CO-436" surfactant were stirred together. This mixture was slowly added to the Laponite/water/CMC mixture under medium agitation. Under agitation the following ingredients were added, in order, to the mixture: 28.3 grams of water, 9.2 grams of the waterborne vinyl resin of the Resin Example above, 2.0 grams of "Acrysol® RM-825," an associative thickener from Rohm & Haas, 6.5 grams of dipropylene glycol monomethyether, and 2.7 grams of glycerin. Enough waterborne burnt umber tint (same as in Example B) was added to raise the tint level to seven percent by weight.

Sag resistance was considerably improved with Example B when applying 3 to 4 mils as compared with Example A. Lubricity, holdout and open time are improved throughout all three wiping steps. A clean wiping cloth was required for the final wipe to thoroughly remove all of the residual wet stain. The use of carboxymethyl cellulose, hectorite clay, and associative thickener in combination produces a stain with the best sprayability, holdout, open time, and lubricity.

EXAMPLES 1-7

Examples 1 through 7 compare a stain composition having the combination of thickeners of the present invention (Example 1) with compositions containing only one or two of the thickeners (Examples 2 through 7). Example 1 is based on the composition of Example B above, and Examples 2 through 7 are the same composition with either one or two of the thickeners removed. For convenience of this comparative test, no colorants were included. From the results reported in the Table, it can be seen that employing less than the entire inventive combination does not attain the excellent results of the present invention.

TABLE I

| | Thickener Composition | | | Results | | | |
| --- | --- | --- | --- | --- | --- | --- | --- |
| Example | CMC | Clay | Associative Thickener | Viscosity 5 rpm/20 rpm | Lubricity | Sag Resistance | Holdout |
| 1 | x | x | x | 400/187.5 cps | 10 | Excellent | Excellent |
| 2 | | x | | 60/20 | 0 | Extremely Poor | Poor/Fair |
| 3 | x | | | 15/20 | 1 | Poor | Fair |
| 4 | | | x | 15/20 | 8 | Poor | Good |
| 5 | x | x | | 460/202 | 4 | Excellent | Excellent |
| 6 | | x | x | 130/57.5 | 3 | Fair | Fair |
| 7 | x | | x | 70/62.5 | 10 | Good | Good |

Viscosities were taken using an RVT Brookfield viscometer with a #1 spindle at 5 and 20 rpm at 77° F. The compositions of Examples 1-7 were each sprayed at 2 mils on a one foot square oak veneer panel. The boards were allowed to flash one minute. Each board was partially wiped and allowed to flash an additional minute. The flash/wipe process was repeated until the sprayed-on material began to show signs of drying. Lubricity, sag resistance and holdout were evaluated and rated on a scale from 0 to 10, with 10 representing excellent behavior resembling that of a high quality oil based stain, and 0 representing poor behavior resembling that of plain water.

Although the invention has been described with reference to particular embodiments representing the best mode of the invention, it should be understood that variations and modifications as are known to those of skill in the art may be resorted to within the scope of the invention as defined by the claims that follow.

I claim:

1. An aqueous wood stain composition comprising:
   (a) water dispersible resin;
   (b) colorant;
   (c) solvent, of which the major constituent is water, the amount of solvent being such that the solids content of the composition is less than 50 percent by weight; and
   (d) thickener including:
      (i) hectorite clay,
      (ii) a water-soluble cellulosic compound, and
      (iii) associative thickener.

2. The stain composition of claim 1 wherein the water-soluble cellulosic compound is selected from the group consisting of methyl cellulose, hydroxyethyl cellulose, carboxymethyl cellulose, and ethyl hydroxyethyl cellulose or salts thereof.

3. The stain composition of claim 1 wherein the water-soluble cellulosic compound is a salt of carboxymethyl cellulose.

4. The stain composition of claim 1 wherein the associative thickener is a urethane based composition.

5. The stain composition of claim 1 wherein the water dispersible resin is a vinyl latex.

6. The stain composition of claim 5 wherein the vinyl latex includes a copolymer of vinyl halide and vinylidene halide.

7. The stain composition of claim 6 wherein the halide is chloride.

8. The stain composition of claim 7 wherein the vinyl latex additionally includes a polymeric surfactant.

9. The stain composition of claim 8 wherein the polymeric surfactant is an acrylic polymer or copolymer containing acid groups.

10. The stain composition of claim 1 wherein the total thickener content is in the range of 1 to 10 percent by weight of the total stain composition.

11. The stain composition of claim 1 wherein the total thickener content is in the range of 1 to 5 percent by weight of the total stain composition.

12. The stain composition of claim 1 wherein the thickener content is (based on total weight of the composition):
   (i) 0.1–5% hectorite clay,
   (ii) 0.02–3% water-soluble cellulosic compound, and
   (iii) 0.5–10% associative thickener.

13. The stain composition of claim 12 wherein the water dispersible resin is present in the amount of 5 to 20 weight percent of the total composition.

* * * * *